(12) United States Patent
Betancourt et al.

(10) Patent No.: US 7,278,057 B2
(45) Date of Patent: Oct. 2, 2007

(54) AUTOMATED HANG DETECTION IN JAVA THREAD DUMPS

(75) Inventors: Michel Betancourt, Morrisville, NC (US); Dipak M. Patel, Morrisville, NC (US); Chintamani Sahoo, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 734 days.

(21) Appl. No.: 10/632,062

(22) Filed: Jul. 31, 2003

(65) Prior Publication Data

US 2005/0028157 A1    Feb. 3, 2005

(51) Int. Cl.
*G06F 11/00* (2006.01)

(52) U.S. Cl. .................. 714/38; 717/131; 718/100; 718/104

(58) Field of Classification Search .................. 714/38
See application file for complete search history.

(56) References Cited

U.S. PATENT DOCUMENTS

| | | | | |
|---|---|---|---|---|
| 5,440,743 A * | 8/1995 | Yokota et al. | | 710/200 |
| 5,590,335 A * | 12/1996 | Dubourreau et al. | | 718/104 |
| 5,809,517 A | 9/1998 | Shimura | | 711/115 |
| 5,835,766 A * | 11/1998 | Iba et al. | | 718/104 |
| 6,009,269 A | 12/1999 | Burrows et al. | | 395/704 |
| 6,101,524 A | 8/2000 | Choi et al. | | 709/102 |
| 6,247,025 B1 | 6/2001 | Bacon | | 707/206 |
| 6,418,542 B1 | 7/2002 | Yeager | | 714/38 |
| 6,507,861 B1 | 1/2003 | Nelson et al. | | 709/104 |
| 6,983,461 B2 * | 1/2006 | Hutchison et al. | | 718/104 |
| 2002/0124085 A1 | 9/2002 | Matsuda et al. | | 709/226 |
| 2002/0147860 A1 | 10/2002 | Tapperson | | 709/330 |
| 2002/0161957 A1 | 10/2002 | Comeau et al. | | 710/260 |
| 2002/0194377 A1 | 12/2002 | Doolittle et al. | | 709/246 |
| 2003/0023655 A1 | 1/2003 | Sokolov et al. | | 709/1 |
| 2003/0023656 A1 * | 1/2003 | Hutchison et al. | | 709/100 |
| 2005/0028157 A1 * | 2/2005 | Betancourt et al. | | 718/100 |
| 2006/0143610 A1 * | 6/2006 | Toader | | 718/100 |

OTHER PUBLICATIONS

Nonaka et al., "A Run-Time Deadlock Detector for Concurrent Java Programs", 2001 IEEE, pp. 45-52.

* cited by examiner

*Primary Examiner*—Robert W. Beausoliel
*Assistant Examiner*—Emerson Puente
(74) *Attorney, Agent, or Firm*—Duke W. Yee; A. Bruce Clay; Wayne P. Bailey

(57) ABSTRACT

A system and method for analyzing Java thread deadlocks. A snapshot of threads in a Java Virtual Machine is generated, producing a thread dump file which can be analyzed offline. The thread dump file is optimistically parsed to identify threads which are deadlocked. A user is provided with an interface to select filtering rules for the threads, resulting in a set of filtered threads which are candidates for being in infinite wait conditions.

8 Claims, 4 Drawing Sheets

Deadlock 1:

"inst: 1 - thd:0" of (sys:0x136B8718)(TID:0x4D3F158)
Holding Resource: java.lang.Object@4D7F028/4D7F030 } 401
Thread Waiting: "inst: 1 - thd:4" (sys:0x136C3490)(TID:0x4D3F018)

"inst: 1 - thd:4" of (sys:0x136C3490)(TID:0x4D3F018)
Holding Resource: java.lang.Object@4D7EFE8/4D7EFF0 } 402
Thread Waiting: "inst: 1 - thd:3" (sys:0x136C3198)(TID:0x4D3F068)

"inst: 1 - thd:1" of (sys:0x136B8A10)(TID:0x4D3F108)
Holding Resource: java.lang.Object@4D7F018/4D7F020 } 403
Thread Waiting: "inst: 1 - thd:0" (sys:0x136B8718)(TID:0x4D3F158)

"inst: 1 - thd:2" of (sys:0x136B8D08)(TID:0x4D3F0B8)
Holding Resource: java.lang.Object@4D7F008/4D7F010 } 404
Thread Waiting: "inst: 1 - thd:1"(sys:0x136B8A10)(TID:0x4D3F108)

"inst: 1 - thd:3" of (sys:0x136C3198)(TID:0x4D3F068)
Holding Resource: java.lang.Object@4D7EFF8/4D7F000 } 405
Thread Waiting: "inst: 1 - thd:2" (sys:0x136B8D08)(TID:0x4D3F0B8)

*FIG. 4*

| | | THREADS THAT HOLDS RESOURCES | | | | |
|---|---|---|---|---|---|---|
| | | inst:1 - thd:0 | inst:1 - thd:1 | inst:1 - thd:2 | inst:1 - thd:3 | inst:1 - thd:4 |
| THREADS WAITING ON RESOURCES | inst:1 - thd:0 | | java.lang.Object @4D7F018/ 4D7F020 | | | |
| | inst:1 - thd:1 | | | java.lang.Object @4D7F008/ 4D7F010 | | |
| | inst:1 - thd:2 | | | | java.lang.Object @4D7EFF8/ 4D7F000 | |
| | inst:1 - thd:3 | | | | | java.lang.Object @4D7EFE8/ 4D7EFF |
| | inst:1 - thd:4 | java.lang.Object @4D7F028/ 4D7F030 | | | | |

*FIG. 5*

AUTOMATED HANG DETECTION IN JAVA THREAD DUMPS

BACKGROUND OF THE INVENTION

1. Technical Field

The present invention relates generally to Java™ virtual machines ("Java" is a trademark of Sun Microsystems, Inc.), and more particularly to analyzing thread dumps in a Java virtual machine.

2. Description of Related Art

Ever since the rise of the Internet, the use of the Java Platform, from Sun Microsystems, Inc., by the software development community has increased significantly. It is partly due to the advantages of its own Java Programming Language, which is object-oriented, distributed, multi-threaded and portable. An Object-oriented programming language such as Java programming language provides programmers flexibility to create modules that do not need to be changed when a new type of object is added; this enables an object to inherit the characteristics of another object, which contributes to reusable software. As a result, development time can be shortened and developers can spend more time on other aspects of the software life cycle.

However, a more important feature of the Java Platform is its portability. Portability means the ability to run a program on any platform. A platform is a hardware or software environment in which a program runs, for example, Windows 2000, Linux, Solaris, and Mac OS. The Java Platform provides such capability by using two mechanisms: the Java Virtual Machine, known as JVM, and the Java Application Programming Interface, known as Java API. The Java virtual machine is an abstract computing machine. Like a real computing machine, it has an instruction set and manipulates various memory areas at run time. The Java virtual machine does not assume any particular implementation technology, host hardware, or host operating system. It is not inherently interpreted, but can just as well be implemented by compiling its instruction set to that of a silicon CPU. It may also be implemented in microcode or directly in silicon.

JVM works in the Java Platform as depicted in FIGS. 3A-C: a program file, with a .java extension 302, is first compiled by the compiler 304 to translate it into Java bytecodes. Java bytecodes are platform independent codes interpreted by the interpreter on the Java Platform. It is in binary format stored in a .class file 306. The interpreter 308 then parses and runs the Java bytecode instruction on the computer 310. In turn the program is only compiled once and interpreted each time the program is executed. The use of Java bytecodes helps to make "write once, run anywhere" possible.

The second component of the Java Platform is the Java API. It is a collection of software components that provide many capabilities, such as a graphical user interface (GUI) widgets. The Java API is grouped into libraries of related classes and interfaces called packages. The programmers primarily use the Java API to write the program. As illustrated in FIG. 3B, the Java API acts as an interface between the program written by the programmer and the Java Virtual Machine, which executes the program in a hardware-based platform by interpreting the Java bytecodes corresponding to the program.

As discussed above, another important feature of the Java Platform is its support for multithreading at the language level. FIG. 3C depicts multithreading in a block diagram. A thread is a basic unit of program execution. At any given time, a program can have several threads running concurrently, each thread performing a different job. The Java language accomplishes such tasks by synchronization, which coordinates activities and data access among multiple threads. The Java Virtual Machine uses a mechanism named Monitors to support synchronization. There is a lock associated with every object or resource in a Java environment. If multiple threads want to operate on the same object, a monitor is used to provide a way for the threads to independently work on the object without interfere with each other. When a thread wants to acquire a shared object, a code segment within a program identified with the synchronized keyword is used to associate a lock with every object that has synchronized code. Once the lock for the object is obtained by performing a lock operation in the JVM, the body of the code segment is then executed. The thread becomes the owner of the object 314, hence an active thread 318. If during the time of execution of the active thread another thread wants to claim ownership of the monitor, it must wait in the entry set 312 of the object along with the other threads already waiting. Once the active thread is finished executing the critical region, it can release the monitor in two ways: it can complete the execution or it can issue a wait command. In the prior case, the thread can simply exit the monitor 320. Alternatively, by issuing the wait command, the active thread becomes a waiting thread in the wait set 316. If the former owner did not issue a notify command before it releases the monitor, only threads in the entry set will compete to acquire the monitor. If the former owner did execute a notify, then the entry set along with any threads in the wait set will compete to acquire the monitor. If a thread in the wait state wins, it then exits the wait set and reacquires the monitor. Once again, it becomes an active thread.

Sometimes when a program executes concurrent thread operations, a deadlock situation may occur. A deadlock occurs when one thread, for example thread t1, owns resource A and wants to acquire resource B, which is owned by thread t2. In order for t1 to access resource B, t1 has to wait until t2 release the monitor for resource B. However, if t2 is waiting for t1 to release the monitor for resource A before it will release the monitor for resource B. Thread t2 will also stuck in a wait state. This creates a situation where neither thread can proceed. Furthermore, if more than two threads are involved in the similar manner, a circular wait condition will occur as each thread holds the resources that other threads want in a cycle. There is also another situation where a thread can be waiting on the resources that it currently owns. This introduces an infinite wait condition since the thread continues to wait for itself.

Deadlock is a well-known problem in the concurrent programming environment. Various approaches have been suggested by existing literature to minimize the issue. A majority of the approaches focus on deadlock avoidance, by educating programmers on how to apply programming techniques that will avoid deadlock. For example, in some systems a resource ordering technique is proposed to ensure the locks are obtained in the same order by all threads. This is accomplished by associating some numeric values to each object and each thread obtains the lock in the order of increasing numbers. That way a strict order is imposed when obtaining locks and a comparison is made at runtime to ensure the order. This method of prevention will only be successful when the programmer applies the principle in the software design along with catching exception when the problem arises. The problem becomes more complex as deadlock occurs during application runtime and no exception is caught at that moment.

Another approach is by using a profiler agent to interact with a currently running JVM. For example, Sun Microsystems has an emerging standard named JVMPI. The JVMPI is a two-way function call interface between the Java virtual machine and an in-process profiler agent. On one hand, the virtual machine notifies the profiler agent of various events, corresponding to, for example, heap allocation, thread start, etc. On the other hand, the profiler agent issues controls and requests for more information through the JVMPI. For example, the profiler agent can turn on/off a specific event notification, based on the needs of the profiler front-end. This provides a way to detect deadlock by looking at the events triggered by the JVM and provides the profiler agent control over certain events. However, this technology only serves the purpose when the JVM is currently running. It does not provide any type of user analysis at the front end to illustrate problem areas.

As shown in the above example approaches, none currently provide the capability to analyze potential deadlocks in large-scale application such as IBM Websphere Application server, where hundreds of threads are involved. Further, none currently process the information for the user to identify potential infinite wait conditions; and none performs analysis of the JVM in an offline mode while the JVM is not running. Therefore, it would be advantageous to have an improved method and apparatus for analyzing thread dumps of a live JVM and in an offline mode to detect deadlocks that are stuck in a circular and infinite wait conditions. It would also be beneficial if such method and apparatus provides analysis across different JVMs, for example, IBM JVM.

SUMMARY OF THE INVENTION

The present invention teaches a system and method for analyzing thread dumps, such as those from an application server such as a WebSphere Application server. The innovative tool can obtain a thread dump or open an existing thread dump, and can analyze thread usage at several different levels. The innovative tool, in a preferred embodiment, allows detection of thread deadlocks based solely on the light weight thread dumps of the Java Virtual Machine (JVM). It also provides a way to detect deadlocks in a JVM and analyze them in offline mode. Multiple threads that are deadlocked in a circular wait condition and individual threads that are deadlocked waiting on themselves are automatically detected and presented to the user for analysis. The user is provided with an interface allowing selection or definition of rules for filtering threads.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 shows an example monitor analysis according to a preferred embodiment of the present invention.

FIG. 5 shows a two dimensional matrix that is populated with threads that hold resources and waiting threads, according to a preferred embodiment of the present invention.

DETAILED DESCRIPTION OF THE PREFERRED EMBODIMENT

Figure 1:
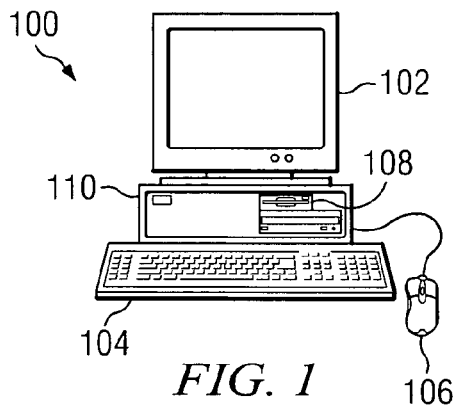
FIG. 1 shows an information processing system upon which a preferred embodiment of the present invention can be implemented.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
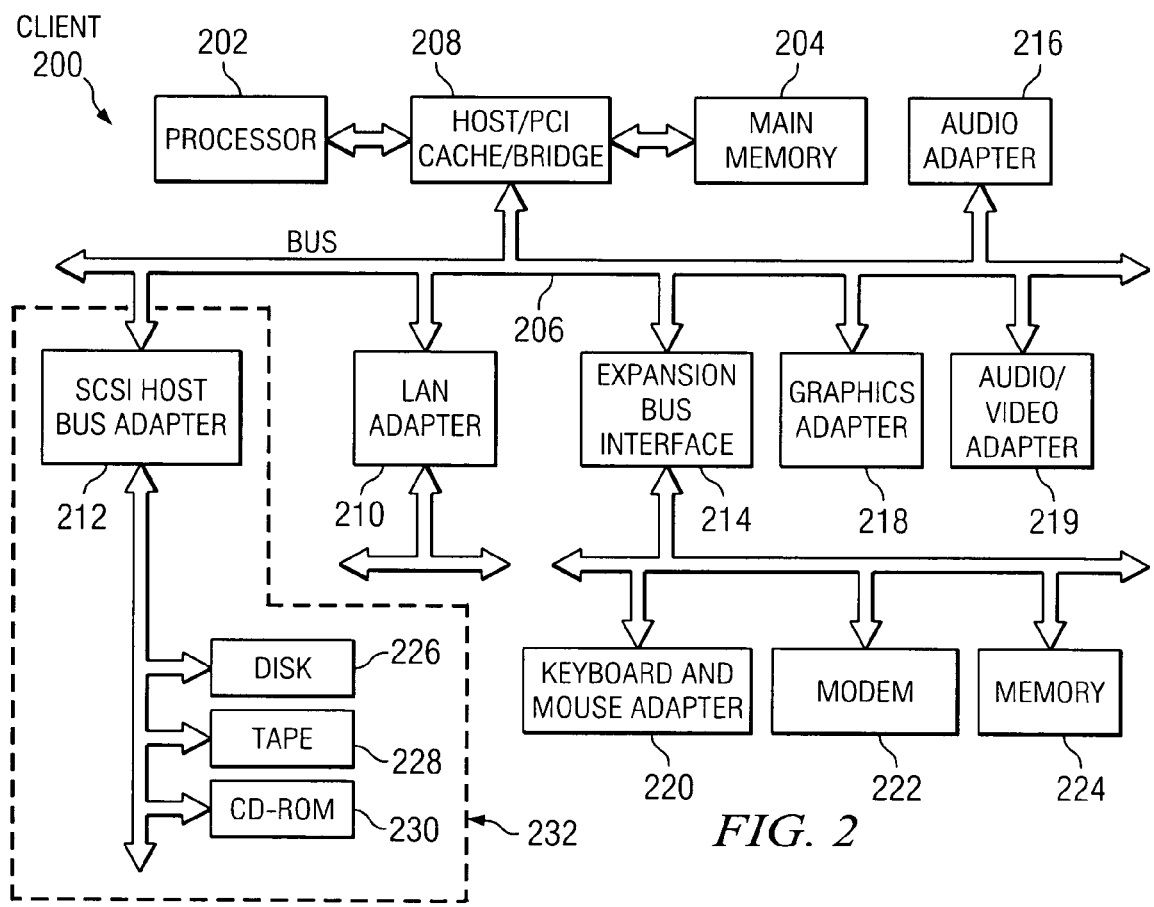
FIG. 2 shows a diagram of the elements of the information processing system of FIG. 1 in accordance with a preferred embodiment of the present invention.
Figure 3A:
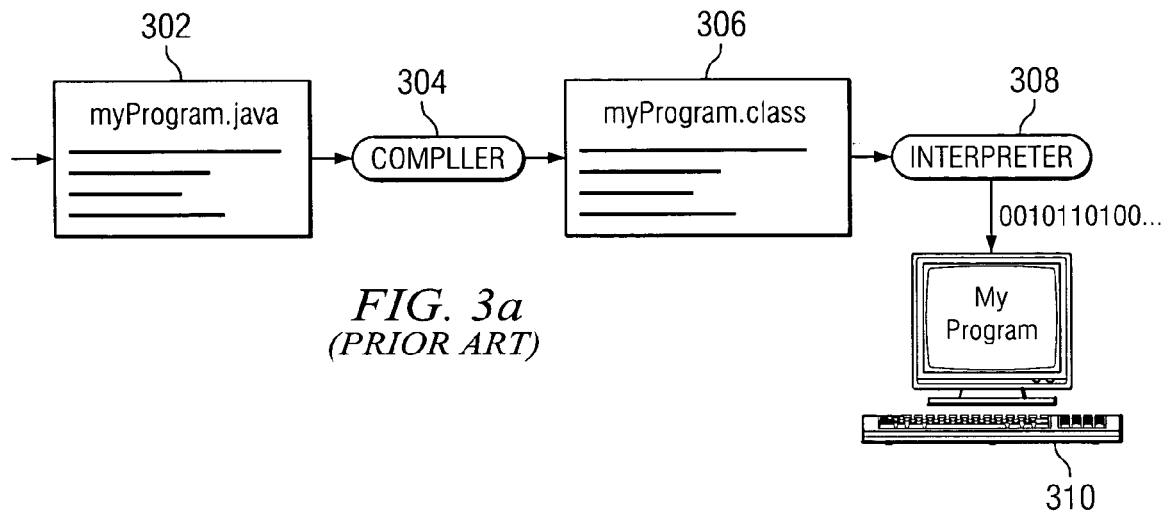
FIGS. 3A-3B show a Java platform and architecture.
Figure 3B:
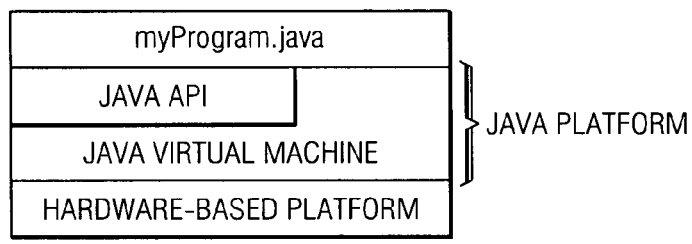
Figure 3C:
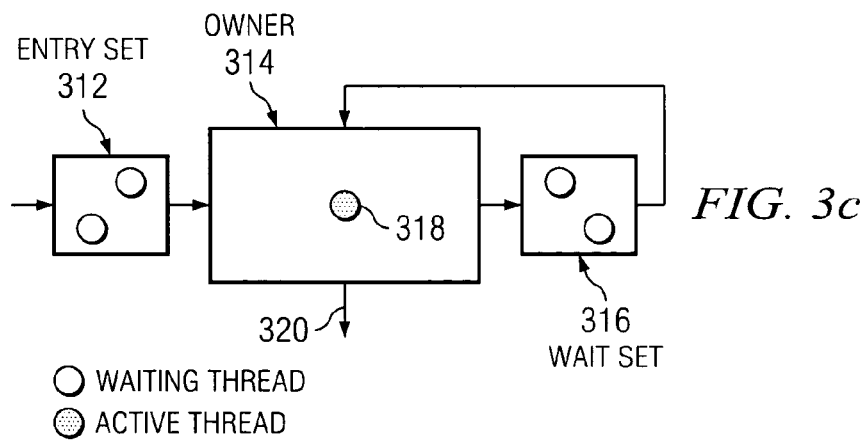
FIG. 3C shows an example of multithreading.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java programming language may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

The present invention is a tool for obtaining and analyzing thread dumps, for example, from an application server (though the invention also allows offline analysis of thread dumps, thus providing the capability performing the analysis on any machine). The tool is preferably capable of detecting threads locked in circular dependencies and threads waiting on themselves (and hence in an infinite wait state). Threads in such states are referred to herein as deadlocked threads, or threads in a deadlock state. Thread analysis can be obtained during an active session of a JVM, or it can be done in offline mode, using a snapshot of thread activity taken during operation and analyzing that information later to detect deadlocks.

Typically, the process for detecting thread deadlocks in a JVM is tedious and time consuming, especially when there are multiple deadlocks to be detected and the JVM contains several hundred threads, which is often the case when complex products (such as, for example, WebSphere Applications Servers, Portal Server, etc.) run on top of the JVM that is failing.

In a preferred embodiment, the present invention automatically detects threads that are hung or deadlocked within the JVM. This includes threads that are stuck due to a deadlock or that are waiting on a resource that will never become available. In a preferred embodiment, the user is also presented with an interface allowing the user to specify or select rules for filtering the threads, for example, to exclude threads the user expects to be in a wait state or that should otherwise be excluded from the analysis. For example, in a preferred embodiment, the interface allows the user to specify properties of threads that should be found waiting on a file, allowing exclusion of these threads from analysis and identification as in a deadlock state.

The thread analyzer tool preferably allows the user to either generate a thread dump of a live JVM, or to read in a thread dump file while in offline mode (e.g., using a thread dump file previously obtained from a live JVM). The thread dump file typically contains hundreds or thousands of lines of raw text data about the threads and resources or monitors in the JVM at the time of the snapshot. Hence, the tool need not be used on the system where the JVM is being run, nor need it be used during operation of the JVM. The thread dump file also includes other information on the threads, such as which thread is holding what resource, and which threads are waiting on which resource.

In a preferred embodiment, there is in the present invention a software layer (parsing layer) which manages parsing of different thread dumps from different JVMs (e.g., IBM, HP, Sun) and presents them in a vendor independent way. Thus, in spite of different formats of thread dumps from different vendors, the present tool hides those differences and complexities and presents results to the user in a vendor independent way.

In a preferred embodiment, the thread analyzer tool performs optimistic parsing of the raw data from the thread dump file, and generates a two dimensional matrix of all the threads that own resources plotted against those threads waiting on those resources. Based on which thread owns the resource that other threads are waiting on, the algorithm determines any circular wait conditions that result into deadlock. The user is then preferably notified of the results. The tool also detects the threads that are in the wait state as well as acting as monitors for the resource upon which they are waiting, hence stuck waiting on themselves. Having detected such threads, the tool preferably notifies the user and requests user input for further analysis. The tool then uses a rule based inference engine to filter the threads that do not meet the criteria specified by the user and hence are candidates for infinite wait.

Using these innovative features, the tool cuts down the time for locating all possible deadlocks from several hours to only a few seconds. And because the tool is easy to use, the customer is also able to detect potential application problems in their environment without having to go through the cycles to open up complaint against support and provide all the data and waiting to hear back from support. The complexity of the tool is thus preferably hidden under the tool's user interface.

Though the thread analyzer is supported on several platforms (e.g., Solaris, AIX, Windows, HP, Linux, and zLinux), the concepts herein disclosed are not limited to any particular platform and can be applied in multiple environments not explicitly mentioned among the examples given here.

FIG. 4 illustrates part of the overall monitor analysis that is displayed to the user after analysis of the thread dump file by the thread analyzer tool. In this example, all the threads identified as being in a potential deadlock condition (or circular wait condition, as in this example) are shown. In deadlock number 1, five different threads are depicted. In section 401, the thread name "inst 1—thd: 0", for example, along with thread identification number sys: 0x136B8718 and TID: 0x4D3F158 is identified as the thread that owns java.lang.Object@4D7F028/4D7F030 resource. This resource is currently waiting to used by thread named "inst: 1—thd: 4" with thread identification numbers sys: 0x136C3490 and TID: 0x4D3F018. Next, in 403, thread named "inst: 1—thd: 0" above is waiting on resource java.lang.Object@4D7F018/4D7F020 holding by thread named "inst: 1—thd: 1" with thread id number sys: 0x136B8A10 and TID: 0x4D3F108. Then, in 404, thread named "inst 1—thd: 1" is waiting on thread named "inst 1—thd: 2" on resource java.lang.Object@4D7F008/4D7F010. Furthermore, in 405, thread named "inst: 1—thd: 2" is waiting on resource java.lang.Object@4D7EFF8/4D7F000 that is owned by thread named "inst: 1—thd: 3". Finally, in 402, thread named "inst 1—thd: 3" is waiting on thread named "inst 1—thd: 4" for resource java.lang.Object@4D7EFE8/4D7EFF0, which is the same thread that we start with in this example. This shows a circular waiting condition, where multiple different threads wait on one another in a closed loop, and that a deadlock may exist.

FIG. 5 illustrates the two dimensional matrix that is populated by the thread analyzer tool (in a preferred embodiment) based on the information from FIG. 4. Resource holding threads populate the matrix across the top, while threads waiting on those resources are shown down the left side. The resource upon which the waiting thread waits is shown in the body chart itself. The chart of FIG. 5 shows the information of FIG. 4 in graphic format.

Figure 6:
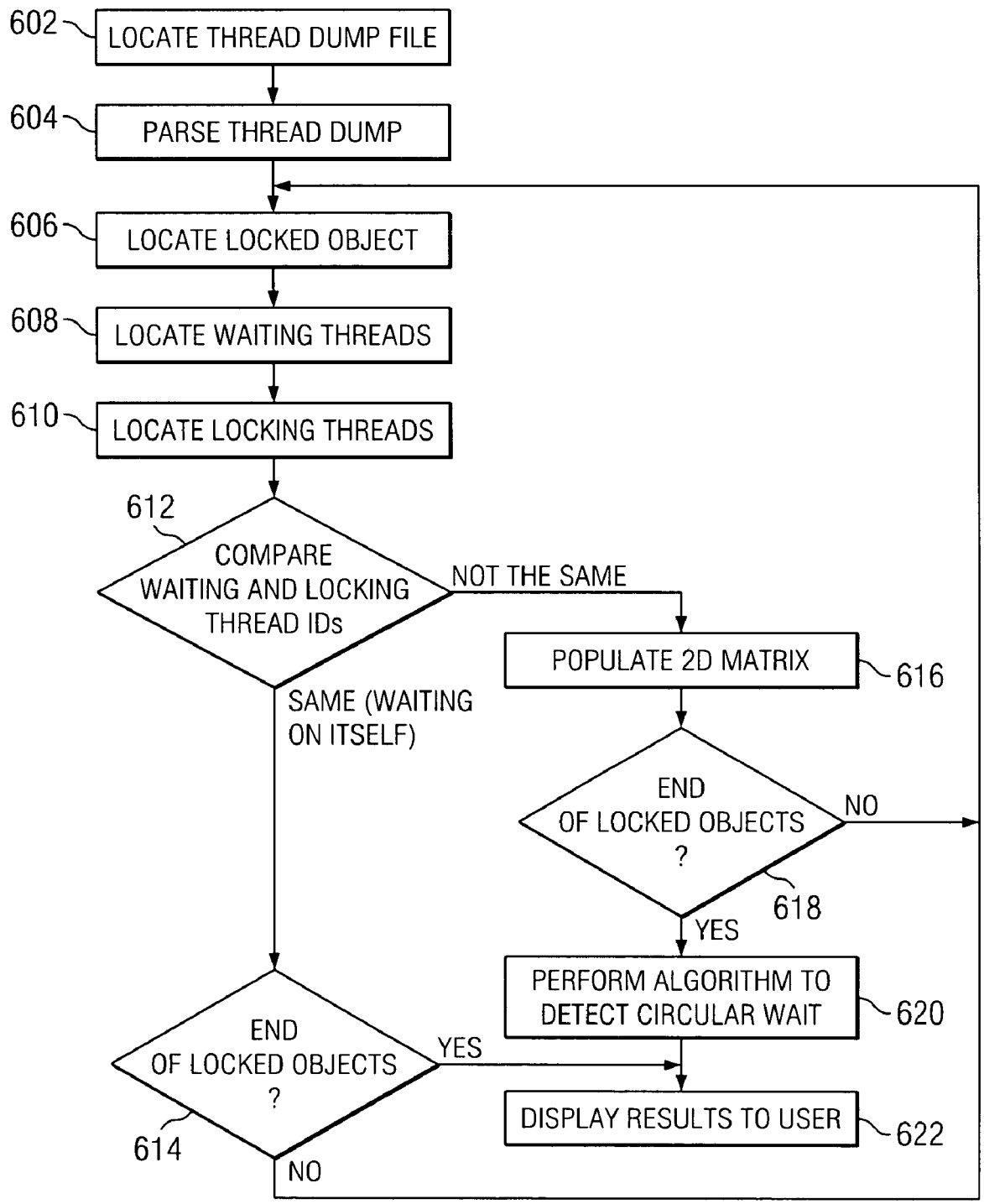
FIG. 6 shows a process flow for a preferred embodiment of the present invention.

FIG. 6 presents a process used in a preferred embodiment of the present invention to identify potential deadlocks from the thread dump file. This example begins after a thread dump file is generated by user's instruction. The instructions preferably include taking a live snapshot of the JVM currently running, opening an existing thread dump file that is saved earlier or using a server output file. The thread dump file is then located (step 602) and parsed (step 604) by the innovative tool to obtain information on threads and resources associated at the time of the snapshot. The tool then locates a locked object (i.e., one that is already in use by a thread) from a list of all the monitors as indicated in the thread dump file (step 606). In turn, the waiting and the locking threads are also identified for the corresponding locked object (steps 608, 610, respectively). This information enables the analysis of deadlock to be performed.

The method used in the present invention provides two types of analysis: to determine threads that are potentially stuck in a circular wait condition and threads that are waiting on themselves, also called a self wait condition. By comparing the thread identifier of the waiting and locking threads (step 612), both types of analysis can be performed. If the waiting thread identifier is the same as the locking thread identifier for a particular locked object, the latter type of analysis, for threads waiting on themselves, is performed. On the other hand, if the identifiers are not the same, the first type of analysis is performed in order to determine possible deadlock. The comparison determines whether the waiting and locking threads have the same ID. IF they are the same, the process checks to see if that is the end of all locked objects (step 614), returning to step 606 if there are more. If in step 612 the IDs are not the same, a two dimensional matrix is populated with the threads that own the locked object and the threads that are waiting on the locked object (step 616). Such a matrix is shown in FIG. 5. Then the process checks to see if all locked objects have been checked, returning to step 606 if there are remaining locked objects (step 618). Finally, when all locked objects are in the 2D matrix, the process uses an algorithm to detect circular waits among the locked objects (step 620). Results are then displayed to the user (step 622).

In one example embodiment, the innovative system and method are implemented as a program residing on an information processing system. It is noted that since the tool can open existing thread dumps, deadlock analysis can be performed remotely or at a later time, after the JVM is no longer actually running. The example embodiment can also collect thread dumps from a running server, allowing immediate live analysis of deadlocks as well. The example embodiment also allows configuration of the tool, such as identifying the port of an appserver to be analyzed, time for the tool to wait for a thread dump to complete before starting analysis, saving thread dump files, and controlling the amount of logging and tracing done by the tool.

The thread analyzer tool can be used to collect thread dumps from a running server. After modifying the setup options, a user interface (such as drop down menus, for example) allows a user to obtain a thread dump, or to analyze an existing thread dump file. Thread dump files are usually saved in the form of a javacore*.txt format. Once the correct thread dump file is selected or obtained, analysis can begin. Multiple thread dumps can also be selected and grouped into a single project and separately identified and analyzed. The tool's analysis of the different thread dumps can be independently viewed to find deadlocks. The user interface also preferably presents other information to a user, such as a graphical depiction of what threads are doing.

A project is a top level storage structure for the thread analyzer tool. Saving a project, in a preferred embodiment, also saves all thread dumps in that project. Opening a project displays all thread dumps in that project. Thread dumps can also be added or removed from projects, and manipulated in other ways (e.g., renaming).

The two ways previously mentioned to obtain a thread dump (i.e., obtaining a thread dump from a running machine and opening an existing thread dump file) can preferably be chosen through the user interface, as well as initiation of analysis of thread dumps. Once analysis is complete, the interface preferably displays results to the user, including flagging of any threads that are deadlocked, but also preferably including other information about the individual threads, and quantitative analysis of all threads analyzed. For example, after analysis is performed, a dialog window will pop up displaying the status of the thread dump. The mode and arrangement of the output is preferably configurable by the user.

It is noted that thread dumps can be obtained in a variety of ways, including the built in method of the present tool, which reads the raw information from the thread and interprets it.

Analysis is preferably summarized and presented to a user for all the threads in a thread dump. This preferably lists the total number of threads and characterizes the threads. When a deadlock is detected in the thread dump, preferred embodiments of the present invention display a message, such as Deadlock(s) found. See Overall Monitor Analysis for Details.

Preferably, an Overall Monitor Analysis can be presented to the user, giving details about the threads and monitors that are actually involved in the deadlock.

The user is preferably also presented with another aspect of the user interface which allows the user to choose rules that are used by the tool to filter threads from the analysis, either before analysis is performed or after. For example, if a user knows that certain threads should be waiting or should otherwise be excluded, the user can choose filtering rules that will eliminate threads conforming with the chosen rules from analysis.

For example, to minimize false positives from threads that are intentionally waiting on themselves, there can be a properties file that is delivered, for example, with WebSphere that contains a list of threads that the vendor would like to exclude from the analysis. These are the threads that the vendor knows will show up as being waiting on themselves most of the time and that this behavior is normal for those threads. If there are such application threads that the user would like to exclude from analysis, they simply add those threads to the properties file.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A system for analyzing thread deadlocks in a Java virtual machine, comprising:

a thread analyzer tool, wherein the tool analyzes a thread dump to automatically identify thread deadlocks, wherein the tool identifies threads that are in a self wait condition and threads that are in a circular wait condition; and a user interface that allows a user to specify criteria, wherein the tool excludes threads that do not meet the criteria from being identified on the user interface as deadlocked threads even though the threads were identified as being deadlocked threads pursuant to the thread dump analysis.

2. The system of claim 1, wherein the tool analyzes a thread dump file in offline mode.

3. The system of claim 1, wherein the tool obtains a thread dump from a running information processing system.

4. A method of analyzing thread deadlocks in a Java virtual machine, comprising the steps of:

obtaining a thread dump of a Java virtual machine;

analyzing the thread dump to automatically identify threads in a deadlock condition, wherein threads in a circular wait condition and threads in a self wait condition are identified; and receiving, by a user interface, user specified criteria from a user, wherein identified deadlock threads that do not meet the criteria are filtered such that they are not presented to the user by the user interface even though the threads that do not meet the criteria were identified as being deadlocked threads pursuant to the thread dump analysis.

5. The method of claim 4, wherein filtered threads are excluded from identification as threads in a self wait condition.

6. The method of claim 4, wherein the tool analyzes a thread dump file in offline mode.

7. The method of claim 4, wherein a matrix is populated to identify threads owning resources and threads waiting on resources, and wherein the matrix is used to identify threads in a circular wait condition.

8. The method of claim 4, wherein the step of analyzing the thread dump to automatically identify threads in a deadlock condition includes the steps of:

(a) identifying, in the thread dump, a locked object that is already in use by a thread;

(b) identifying threads that own resources the thread that has locked the locked object;

(c) identifying each waiting thread that is waiting on the locked object; and (d) comparing the results from steps (b) and (c), and then repeating steps (a)-(c) for each locked object in the thread dump, to identify the threads in the circular wait condition and the self wait condition.

* * * * *